Sept. 9, 1924.
H. MAYER
1,507,847
SIGNAL DEVICE FOR MOTOR VEHICLES
Filed Dec. 1, 1922
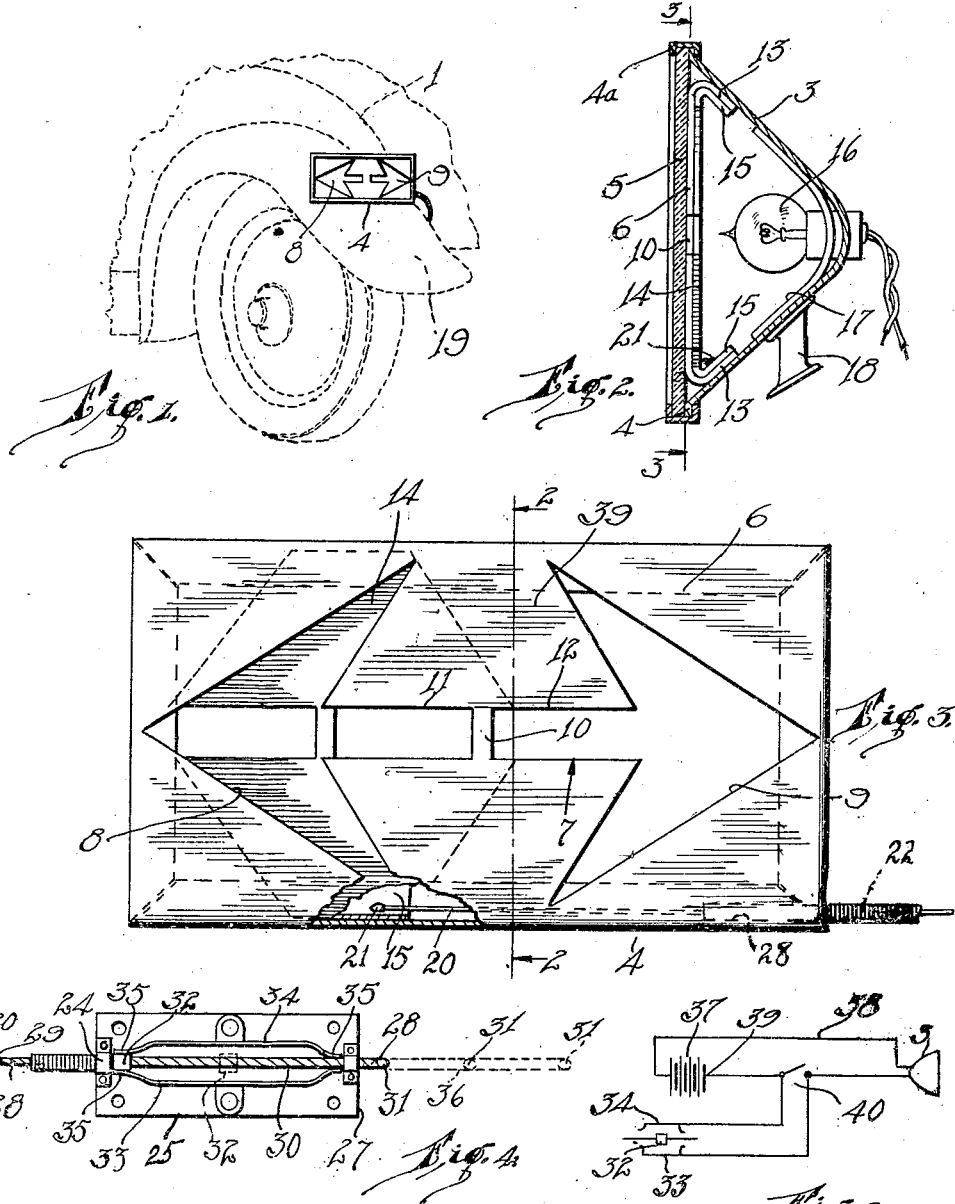
INVENTOR
Harry Mayer
BY
ATTORNEYS Patented Sept. 9, 1924.

1,507,847

UNITED STATES PATENT OFFICE.

HARRY MAYER, OF CHICAGO, ILLINOIS.

SIGNAL DEVICE FOR MOTOR VEHICLES.

Application filed December 1, 1922. Serial No. 604,310.

*To all whom it may concern:*

Be it known that I, HARRY MAYER, a citizen of the United States, and a resident of Chicago, in the county of Cook and State of Illinois, have invented a new and useful Improvement in Signal Devices for Motor Vehicles, of which the following is a full, clear, and exact description.

My invention relates to improvements in signals for motor vehicles, and it consists in the combinations, constructions, and arrangements herein described and claimed.

An object of my invention is to provide a signal device of the character described which consists in the provision of a single unit which may be fixed upon the rear of the motor vehicle and operated from the driver's seat to indicate the direction in which the vehicle is about to be turned.

A further object of my invention is to provide a device of the character described in which a stencil is employed and light projected through the stencil, and in which the stencil is actually changed to provide one of three different legends, each of which has a particular significance to vehicle drivers who are in a position to observe the signal device.

A further object of my invention is to provide a signal device of the character described in which the change of the stencils is brought about when the lamp for illuminating the stencil is extinguished, thereby precluding the possibility of confusion to persons who may watch the signal device to ascertain the direction in which the vehicle is about to turn.

A further object of my invention is to provide a signal device of the character which also includes the provision of a stop signal which is automatically actuated by the foot brake or any other well known means.

A further object of my invention is to provide a signal device of the character described that is extremely simple in construction, that may be readily applied to the ordinary type of motor vehicle, and which is thoroughly practical for the purpose intended.

Other objects and advantages will appear in the following specification, and the novel features of the invention will be particularly pointed out in the appended claim.

My invention is illustrated in the accompanying drawings, forming part of this application, in which—

Figure 1 is a perspective view of that portion of the signal device that is intended for the observation of other vehicles or pedestrians. The device is shown applied to the rear fender of a motor vehicle, Figure 2 is a sectional view through that portion of the signal device shown in Figure 1, and is taken along the line 2—2 of Figure 3, Figure 3 is a sectional view along the line 3—3 of Figure 2, Figure 4 is a top plan view of the manually operated switch and clutch rod for operating the device, Figure 5 is a perspective view of the mechanism illustrated in Figure 4 operatively applied to the dash and motor vehicle, and Figure 6 is a diagrammatic view of the electrical connections employed in operating my signal device.

In carrying out my invention, I make use of a motor vehicle, the rear portion 1 of which is indicated in dotted lines in Figure 1, and the instrument dash 2 of which is indicated in dotted lines in Figure 5.

In Figure 1 I have illustrated that portion of the signal device which is intended for the observation of vehicles immediately behind the vehicle 1 or pedestrians. This mechanism is more clearly illustrated in Figures 2 and 3 and consists in a housing 3 substantially V-shaped in cross section and having the forward or open end provided with a radially outwardly extending flange 4. A glass 5 is secured in place upon the flange 4 by means of a retaining ring 4ª, as shown in Figure 2. The glass 5 consists of a transparent tinted glass. I prefer to employ the ruby tint ordinarily used in the tail lamp or stop signal of motor vehicles.

A metal stencil 6 is fixed within the housing 3 and is provided with a stencil opening representing a two-headed arrow 7, as shown in Figure 3, the head portions of the arrow being indicated at 8 and 9, one of which is pointed toward the left side of the stencil, and the other of which is pointed toward the right side of the stencil. The reenforcing rib 10 is left between the adjacent portions 11 and 12 of the stem of the arrow substantially at the central point thereof. The four sides of the stencil 6 are provided with laterally bent portions 13, which portions are bent at an angle of substantially 45 degrees from the rear face of the stencil. These laterally bent portions further serve to hold the stencil in place in the housing 1 and may be welded to the housing or fixed thereto by any well known means.

The member 6, which I have heretofore referred to as a stencil, I shall designate as the stationary element of the stencil. A movable element 14, which is in itself a stencil, as in the case of the element 6, is provided and is arranged to closely contact the inner side of the stencil 6. The stencil 14 also has laterally bent portions 15 which are arranged to abut and slide upon the laterally bent portions 13 of the stencil 6. The stencil element 14 is therefore free to slide laterally from one end of the stencil 6 to the other end. The general shape and contour of the stencil 14 is clearly shown in Figure 3, a portion thereof being shown in dotted lines. When the stencil element 14 is in the position shown in Figure 3, the head portion 8 of the arrow 7 is shielded from behind so that light, as from a lamp 16 disposed at the rear of the housing 3, will pass through the combined stationary and movable elements of the stencil, and the beam of light will have the shape of an arrow pointing to the right. If, however, the movable element 14 of the stencil is moved to the opposite end of the stencil 6, the light passing therethrough from the lamp 16 will be in the form of an arrow with its head pointing to the left. A reflector 17 is provided in back of the lamp 16 and serves to direct the light rays which are emitted from the lamp 16 through the stencils 6 and 14.

A supporting member 18 is fixed to the housing 3 and furnishes a suitable means for fixing the housing upon the rear fender 19 of the motor vehicle 1, or the front fender thereof as the case may be.

Means for manually actuating the stencil 14 is provided as follows. A flexible wire 20, usually a braided wire, is soldered, as at 21, to the lower portion 15 of the stencil 14 and is conducted through a flexible tube 22 which is securely fixed to the stencil 6 at 23 by solder or the like. This tube I choose to construct of a spiral wire which is closely wound so as to have the advantage of flexibility. The opposite end of the tube 22 is passed under the body of the vehicle and up to the dash 2 where it is fixed by a strap 24 to an insulating plate 25, which plate is secured to the underside of the dash 2 of the motor vehicle so that the forward end 27 thereof projects slightly in front of the dash. The wire 20 of course extends entirely through the tube and is soldered to a relatively rigid rod 28 at 29, a point immediately adjacent the strap 24, yet within the tube 22. The rod 28 is covered with an insulating material 30, such as shellacked fabric tubing or insulating enamel and the like from a point adjacent the point 29 to the outer end thereof. The outer end of the rod 28 is bent downwardly at 31 (see Figure 5). A metal band 32 is fixed upon the insulating material 30 at a predetermined position intermediate the length thereof and in a certain predetermined position hereinafter described.

The plate 25 is provided with a pair of contacting members 33 and 34, each having two contact shoes 35. The shoes 35 of the contact members 33 and 34 are in registration with one another but normally apart. The contact members 33 and 34 are disposed one on either side of the rod 28 so that when the rod 28 is oscillated longitudinally, the metal contact member 32 will bridge the spaced apart contact members 35 at one end of the plate and the rod is at one end of its oscillatory movement and will bridge the shoe 35 at the opposite end of the plate when the rod is at the other end of its oscillatory movement. Normally when the signal device is not in use, the laterally bent portion 31 of the rod is in the position shown in Figure 4 and indicated generally at 36. The device as shown in full lines in Figure 4 presents the rod 28 in a position with its laterally bent portion 31 closest to the dash. When the rod is in this position, the movable stencil element 14 is at the end of the stencil 6 shown in Figure 3 and the lamp of course is illuminated. Means for illuminating the lamp when the rod 28 is oscillated at the limit of its oscillatory movement is provided in a battery 37, one pole of which is connected directly to the lamp by means of a conductor 38 which may be the ground or frame of the car. The opposite pole 39 of the battery is connected to the lamp 16 through the switch formed by the oppositely disposed members 35 of the contact plates 33 and 34. The current will pass from one shoe to another through the metal band 32, since that band is in contact with the shoes 35. If, however, the band 32 is in the position shown in dotted lines in Figure 4, then the lamp 16 will not be illumunated and the movable stencil element 14 will be in a position exactly in registration with the central portion 39 of the stationary stencil element 6. The stencil will then bear a legend which represents a two-headed arrow. A switch 40 is further included in the electrical circuit shown in Figure 6 and is closed by the application of the brake in a manner well known and described in the many patents on stop lights and switches for operating stop lights. This construction is so common that it is not deemed necessary to described it other than mention that the switch 40 is a switch that is operated by means of a cord or the like secured to the brake rod and which switch will close only when the brake rod is moved to apply the brake.

From the foregoing description of the various parts of the device, the operation thereof may be readily understood. Normally, when my signal device is not in use, the rod 28 is disposed so that the contact member 32 is in the position shown in dotted lines in Figure 4 when the laterally bent portion 31 is in that position indicated at 36 in Figure 4. The movable element of the stencil 14 will then be in exact registration with the intermediate portion 39 of the stencil 6. The openings through the two stencils will then be in the shape of a two-headed arrow.

If at this time the driver of the vehicle applies his brakes, movement of the brake rod will actuate the switch 40 (see Figure 6) and the lamp 16 will become illuminated and the two-headed arrow formed by the combined stationary and movable stencils, will be visible and warn drivers of motor vehicles in the rear that the vehicle is about to stop or slack up.

If the driver of the motor vehicle desires to indicate to those in the rear that he is about to turn to the right, he will manually move the lever 28 to the position that is indicated in the full line in Figure 4. The contact member 32 will then bridge the contact members 35 adjacent to the rear of the plate 25. The lamp 16 will burn and the movable stencil element 14 will lie in the position shown in the full lines in Figure 3, it having been moved to that position by virtue of the movement of the wire 20 which is secured to the rod 28 and moved therewith. The vehicles in the rear of the vehicle 1 will thereupon observe an arrow pointing to the right. This arrow will be in the form of a red illuminated arrow and may be clearly observed.

If, however, the driver wishes to inform those in the rear that he is about to turn to the left, he will move the lever 28 to the position shown in outermost dotted lines in Figure 4. The lamp 16 will burn because of the contact of the metal ring 32 with the shoes 35 at the end of the plate 25, and the movable element of the stencil 14 will be moved to a position at the opposite end of the stencil element 6 from that position viewed in Figure 3. The arrow formed by the movable and stationary stencil members 14 and 6 will thereupon point to the left and will be illuminated.

I do not limit the use of my signal to a horizontal position, since the same may be used in a vertical position as a traffic signal.

The signal, when not in use, will appear as a mere tinted glass. The interior of the housing being in darkness by this fact, no part of the stencil or legend will be visible through the colored lens 5. When operated as described, each legend will be stenciled by rays of light on the colored lens 5 as shown in Figure 1, and be visible night or day.

I claim:

A signal device of the character described comprising a source of light, a stationary stencil placed in front of said light having an opening therethrough in the shape of an arrow having a pointed head at each end thereof, a movable element arranged to slide laterally mounted in the rear of said stencil and arranged to be entirely concealed when said movable element is midway between the tips of said arrow-shaped opening in said stencil, said movable element having slots therein arranged to register with the opening in said stationary stencil forming the shaft of said arrow, whereby said movable element when moved to either end of said stationary stencil may close that part of the opening forming the head of the arrow adjacent to the movable stencil.

HARRY MAYER.